(No Model.) 2 Sheets—Sheet 1.
J. TEGGART.
CONDUIT FOR UNDERGROUND ELECTRIC WIRES.
No. 321,865. Patented July 7, 1885.
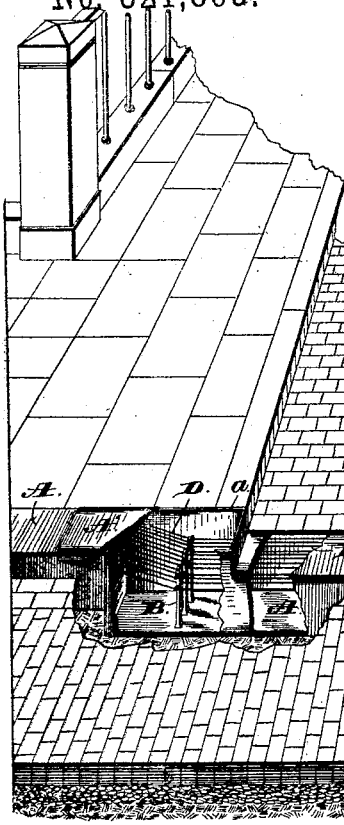
Fig. 1.
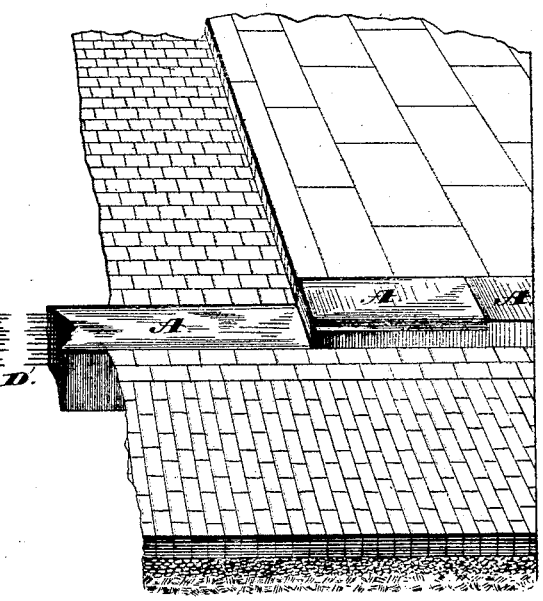
Fig. 2.
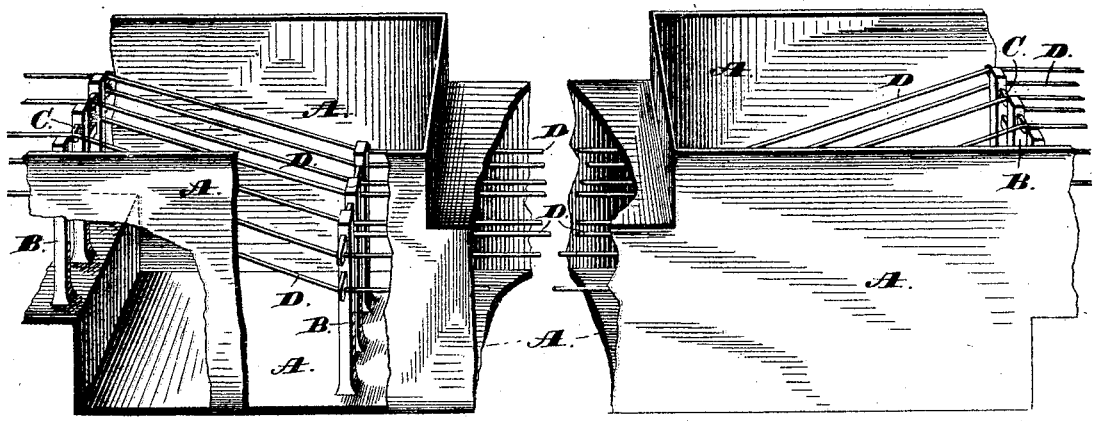
Witnesses:
Jas. E. Hutchinson.
Henry C. Hazard.
Inventor
John Teggart, by
Prindle & Russell, his Attys (No Model.) 2 Sheets—Sheet 2.

J. TEGGART.
CONDUIT FOR UNDERGROUND ELECTRIC WIRES.

No. 321,865. Patented July 7, 1885.

Witnesses:
Jas. E. Hutchinson
Henry C. Hazard

Inventor.
John Teggart, by
Prindle & Russell, his Attys

UNITED STATES PATENT OFFICE.

JOHN TEGGART, OF SAN FRANCISCO, CALIFORNIA.

CONDUIT FOR UNDERGROUND ELECTRIC WIRES.

SPECIFICATION forming part of Letters Patent No. 321,865, dated July 7, 1885.

Application filed November 21, 1884. (No model.)

*To all whom it may concern:*

Be it known that I, JOHN TEGGART, of San Francisco, in the county of San Francisco, and in the State of California, have invented certain new and useful Improvements in Conduits for Underground Electric Wires; and I do hereby declare that the following is a full, clear, and exact description thereof, reference being had to the accompanying drawings, in which—

Figure 3:
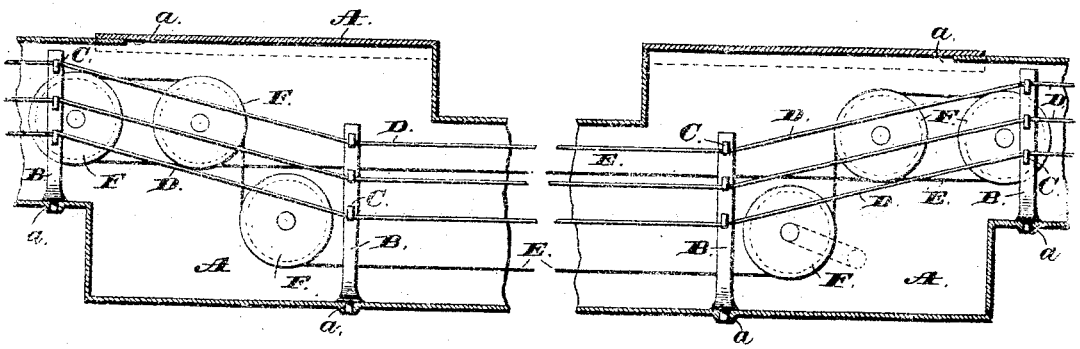
Figure 4:
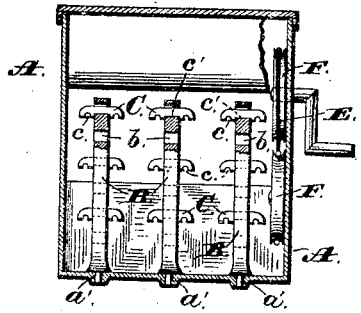

Figure 1 is a perspective view of my apparatus as arranged for use in a street. Fig. 2 is an enlarged perspective view of a section of the same, the top and a portion of one side being removed to show the interior arrangement of parts. Fig. 3 is a vertical longitudinal section of the portion which crosses an intersecting street, and Fig. 4 is a cross-section of said apparatus.

Letters of like name and kind refer to like parts in each of the figures.

The design of my invention is to enable electric wires to be placed underground without interference with the pavement, and to render said wires easy of access for the purpose of repair or renewal; to which end said invention consists in the construction, arrangement, and combination of parts, as hereinafter specified.

In the annexed drawings, A designates a box constructed, preferably, from metal, and having in width substantially the like dimensions of an ordinary curbstone, and such depth as to adapt it to receive the desired number of electric wires. Said box or conduit is placed in the position usually occupied by a curbstone, between the foot-walk and roadway, and at intersecting streets has a downward offset to enable it to pass beneath the roadway. Said conduit is provided at suitable points at its upper side with openings $a$, that are inclosed by removable covers A', for the purpose of obtaining ready access to its interior. At suitable points within the conduit A standards B, preferably composed of metal, are secured within the bottom, and from thence extend upward nearly to the top of the same. Said standards may be placed in line transversely at the openings $a$, or they may be arranged in a dodged form, as desired. At or below its upper end each standard B is provided with one or more transverse openings, $b$, each of which is adapted to receive a cross-bar, C, composed of glass or other non-conductor of electricity, which cross-bar has within each projecting portion one or more notches, $c$, or other equivalent means, for receiving and containing a wire, D, and confining the same in lateral and vertical position. The standards B are each supported in a socket, $a'$, that is formed within the bottom of the conduit A, so as to be easily removed from or placed in position, while each cross-bar C is provided, within its lower edge, with a notch, $c'$, or is in other manner constructed so as to enable it to maintain its position within its standard while easily placed within or removed from the same.

As seen in Fig. 3, the standards B, with their cross-bars C, are arranged at the intersection of the upper and lower levels of each vertical offset, so as to cause the wires D to follow the line of the conduit. They are also placed at such points midway between the corners of each block as may be rendered necessary by the length of the block.

In order that wires may be readily introduced into the conduit A after the same is in position for use, an endless cable, E, is placed within said conduit, and is supported by and passes over or around suitably-grooved pulleys F, which are journaled upon the side wall or upon other equivalent support provided therefor. Said cable may be moved longitudinally by a crank attached to one of said pulleys, or by any usual or well-known appliances for such purpose; or it may be so moved by being grasped by the hands of the operator and pulled lengthwise; but in either case furnishes means whereby a wire, having its end secured thereto, may be drawn through said conduit within reach of persons at the handholes, so as to be placed by them in position upon the cross-bars.

While it is practicable to operate long lengths of the cable E, it will probably be most advantageous to have comparatively short lengths or relays of such cable.

Having thus described my invention, what I claim is—

1. In a conduit for electric wires, the means for holding the wires separate from each other, consisting of the standards provided with one or more transverse openings and one or more transverse arms passing through such opening or openings, each provided with a notch adapted to receive and embrace a portion of the standard, and near its ends with notches to receive and hold the wires, substantially as and for the purpose described.

2. In combination with the conduit for electric wires having the depressed portion, one or more standards projecting up from the bottom of the conduit just beyond the ends of such depressed portion, having cross-arms notched on their upper sides and of such length as to leave spaces between their ends and the sides of the conduit, and one or more standards within the depressed portion at or near each end thereof, having cross-arms of such length as to leave spaces between their ends and the conduit sides, and provided with wire-receiving notches on their lower sides, substantially as and for the purpose described.

3. In combination with the conduit for wires provided with suitable supports for the wires, the means for carrying the wires along through the depressed portions of the conduits under street and other crossings, consisting of the two pulleys at each end of the depressed portion, substantially on a level with the elevated or main portion of the conduit, a pulley within the depressed portion near each end thereof, and an endless rope or cable passing under and over the elevated pairs of pulleys and having the part so passing over these pulleys running down under the lower pulleys, substantially as and for the purpose described.

In testimony that I claim the foregoing I have hereunto set my hand this 17th day of October, A. D. 1884.

JOHN TEGGART.

Witnesses:
 WM. D. HARPER,
 JAMES McKEOWN.